INVENTOR.
MELVIN A. MORRILL
BY
Huebner, Maltby & Koehler
ATTORNEYS

Patented June 7, 1949

2,472,260

UNITED STATES PATENT OFFICE 2,472,260

SIDE DELIVERY RAKE

Melvin A. Morrill, Laton, Calif.

Application January 25, 1947, Serial No. 724,274

15 Claims. (Cl. 56—377)

The present invention relates to agricultural implements and more particularly to side delivery rakes. The device of the present invention is further adapted for use as a cultivator advantageously employed for the combing of weeds, roots, and other debris from the soil, as in the preparation of plowed sod for planting. It will be obvious as the description progresses that certain features of the invention have their greatest utility in raking operations but may be employed to good advantage in other operations.

Conventional side delivery hay rakes have certain disadvantages which the device of the present invention seeks to overcome. Such conventional rakes are unable to adapt themselves to uneven terrain and thus gather the hay inefficiently. This inability to adjust to uneven terrain frequently results in damage to the rake when its rigid construction is subjected to the various stresses imposed thereon by movement over the uneven terrain. Conventional side delivery hay rakes tangle and shatter the hay as it is rolled to the side. Said rakes are slow in operation, are capable of being turned only one direction while operating, and are only slowly and tediously transported from place to place. Further, their many gears, sprockets, driving chains, and other moving and intermeshing parts have provided many points of wear and sources of maladjustment.

An object of my present invention is, therefore, to provide an improved side delivery hay rake adapted to accommodate uneven terrain over which it is operated.

Another object is to rake hay into rows with a minimum of tangling and shattering of the same.

Another object is to provide an apparatus conducive to the speedy and efficient raking of hay.

Another object is to provide a side delivery hay rake that may be turned in either direction during operation.

Another object is to provide a conveniently transported hay rake.

Another object is to reduce wear, maladjustment, and friction incident to the many moving and intermeshing parts of conventional side delivery hay rakes.

Another object is to provide ground engaging means motivating the raking action of the present invention in response to movement of the rake over the ground.

Another object is to provide elevational controls individual to the raking means of the present invention.

Further objects are to provide a rugged, efficient, and economical combined hay rake and cultivator and to provide improved elements and arrangements thereof in a device of the character and for the purposes set forth.

Other objects and advantages will appear from the further description in the specification.

Figure 1:
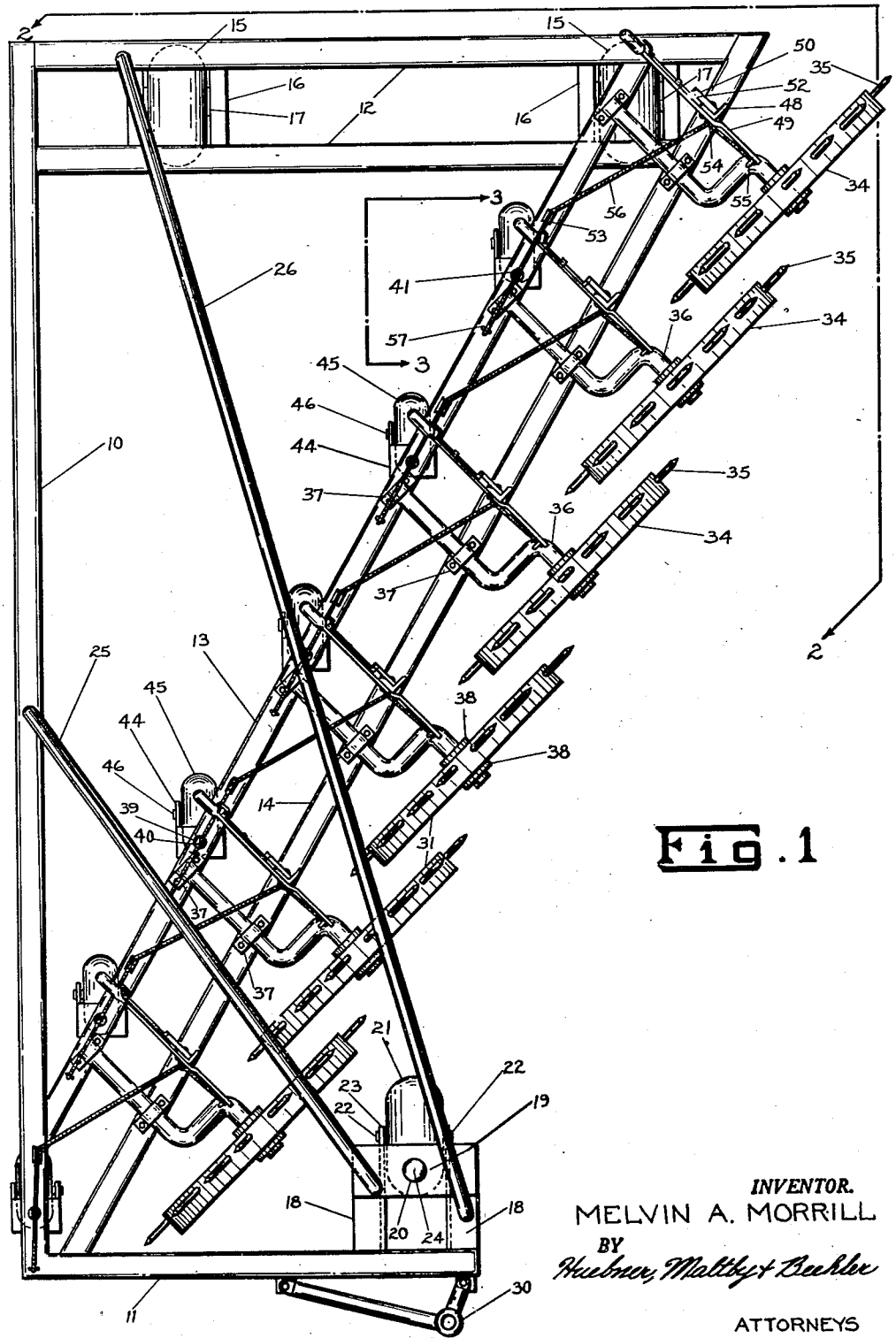
Fig. 1 is a plan view of a side delivery hay rake embodying the principles of the present invention.

Referring in greater detail to the drawings:

In Fig. 1, a support frame of substantially rigid construction is shown comprising a longitudinal member 10, a forward transverse member 11, a pair of rear transverse members 12, and a pair of diagonal members 13 and 14. The diagonal members, as shown in Fig. 1, are spacially positioned in parallel relation and are diagonally arranged in the support frame. Said longitudinal, transverse, and diagonal members of the support frame bear the major strains incident to the operation of the hay rake and are preferably fabricated from strong and rigid, but relatively light weight, material, such as box-beam iron weldedly secured.

The rear of the support frame is supported by a pair of laterally spaced, fixed, rear wheels 15 rotatably mounted below the frame by depending yokes 16, secured to the underside of the rear transverse members 12, and axles 17. To support the front of the frame, a pair of struts 18 are welded to the front transverse member 11 and rearwardly directed therefrom. A pillow block 19, containing a swivel bearing 20, is mounted in a substantially erect position between the rear ends of struts 18. A swivel wheel 21 is mounted under the support frame by an axle 22, wheel yoke 23, and a swivel shaft 24 engaged in the swivel bearing 20. The yoke is directed rearwardly at its lower end portion to cause the wheel 21 to operate in the manner of a castor.

Arched bridges 25 and 26 are employed to add strength to the support frame. The bridges each conveniently comprise a pair of tubular elements 27, arched to span raking elements, presently more fully described, and joined by web elements 28. The bridge 25 is welded in place between the struts 18 and the longitudinal member 10. The bridge 26 is welded in place between the struts 18 and the rear transverse members 12 near the rear, right corner of the support frame. Braces 29 are welded between the bridges and the diagonal members 13 and 14 to further strengthen the support frame. A draft means is indicated generally at 30 connected to the front transverse element 11. It is to be understood that the support frame, the draft means, the wheels and their mountings, herein described comprise a convenient mobile support for the rake. The present invention is not limited to the support described.

It has been found advantageous to employ a plurality of floating, raking elements 31 individually elevated or depressed in response to an uneven terrain over which the rake is drawn. The raking elements preferably comprise wheels of rugged construction having hubs 32, spokes 33 and rims 34. Outwardly extended from the rims are raking spikes or teeth 35. Said teeth may be of flexible or rigid construction in keeping with the raking or cultivating operations to be performed. Such teeth have been described in another patent application filed by the present inventor and later referred to herein.

The raking elements 31 are preferably rotatably mounted in the support frame in overlapping relation, angularly displaced from the normal direction of movement of the rake. To this end, crank levers 36 are mounted on the diagonal members 13 and 14 by pillow blocks 37. The raking elements are journaled on the crank levers in relative echelon relation, each raking element having a substantially vertical plane of rotation, the planes of rotation of the raking elements being substantially parallel, and all planes being angularly displaced from the direction of movement of the rake during normal operation. Thrust bearings 38 mounted on the crank levers at each side of each raking element keep the raking elements in place. By mounting the teeth 35 near an edge of the rims, and mounting the raking elements, so that the teeth are borne by the rearward side of the rims; said rims aid in retaining the hay in teeth engagement as the teeth move the hay.

Figure 4:
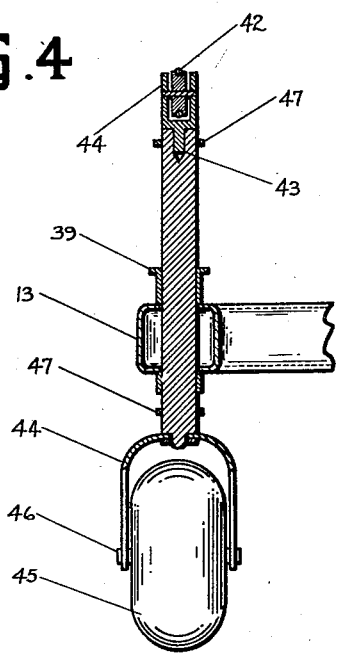
Fig. 4 is a section taken on line 4—4 of Fig. 3.

Further, it is desirable to support the raking elements so their ground clearance or engagement may be predetermined by adjustment and, once adjusted, that the raking elements shall rise and fall automatically in response to uneven terrain traversed. To this end, bearings 39, individual and adjacent the raking elements, are provided in the mobile support frame in substantially vertical positions. The bearings are preferably laterally and slightly forwardly positioned from the centers of the raking elements 31. It is convenient to mount the front bearing in the longitudinal member 10 and the remaining bearings in the diagonal member 13. As shown in Fig. 4, journal posts 40 are rotatably and slidably mounted in the bearings. At the upper end of each journal post, a sheave block 41, containing a sheave 42, is mounted on the post, as by a bolt 43, so as to rotate relative to the post while remaining in vertical alignment therewith. A yoke 44 is mounted at the lower end of each post and in turn mounts a control wheel 45 by means of a shaft 46. So mounted the control wheels are free to swivel and to rise and descend relative to the support frame in response to uneven terrain encountered. Collars 47 are mounted on the journal post above and below the bearing to limit the vertical travel of the post.

Figure 2:
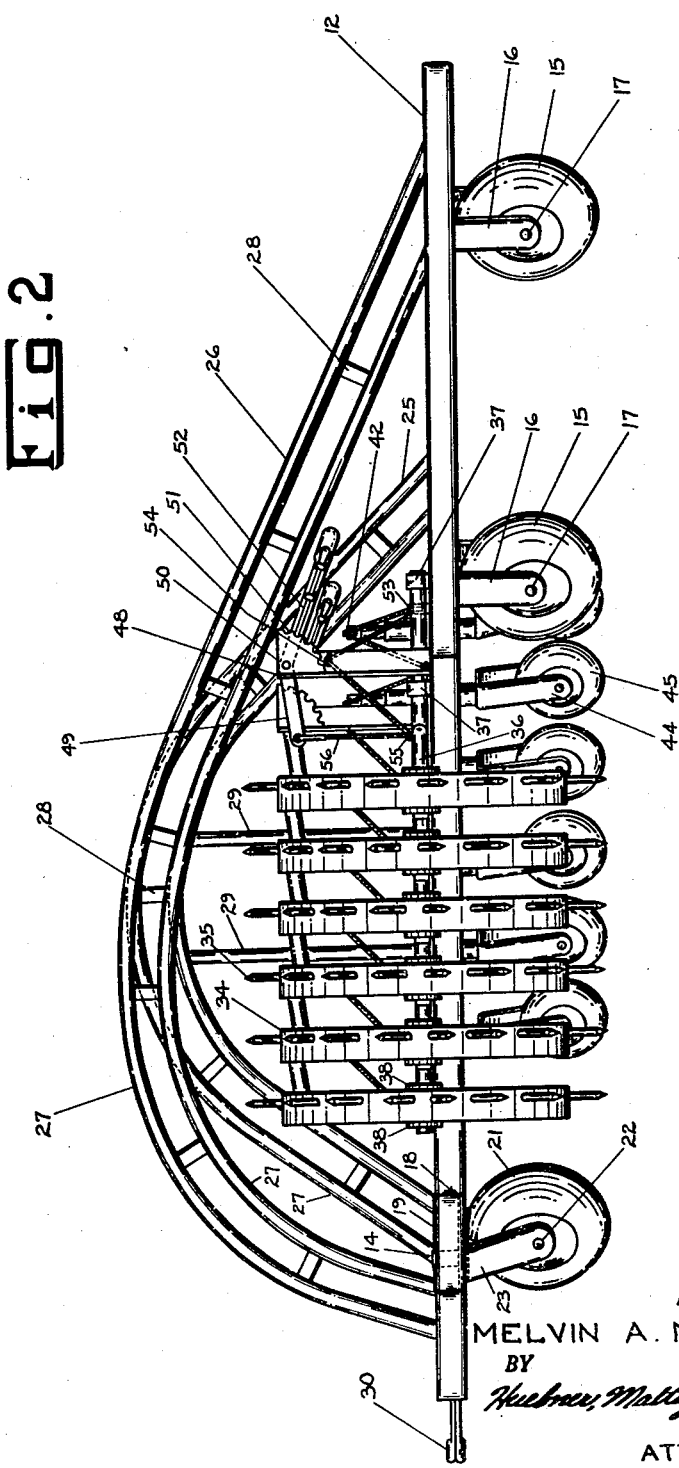
Fig. 2 is an elevation of the rake looking in the direction of the arrows 2—2 in Fig. 1.
Figure 3:
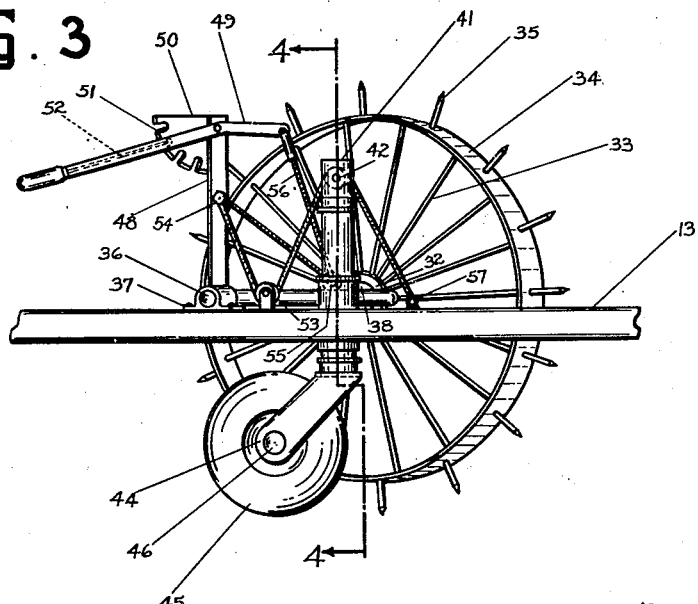
Fig. 3 is an enlarged elevation of a raking unit and elevational control therefor looking in the direction of the arrows 3—3 in Fig. 1.

Adjacent each raking element, an erect post 48 is mounted, as shown in Figs. 1, 2, and 3. To adjust the elevation of each raking element, a lever 49 is pivotally supported by the upper end portion of each post so that an end thereof is elevated above the crank lever of its respective raking element. An arcuate plate 50, having peripheral receptacles 51, is borne by the post concentrically with the pivot point of the lever. A spring loaded, grip operated, catch 52 is provided on the lever in a position where the catch may engage the receptacles to lock the lever in adjusted attitude. The arcuate plate and catch comprise a convenient positioning and locking means for the lever. It is to be understood that other positioning means, such as hydraulic controls, may be employed without departing from the spirit of the invention.

A sheave 53 is mounted on the diagonal member 13 rearward of each bearing 39, a sheave 54 is mounted on each of the posts 48, and a sheave 55 is secured to each crank lever 36 near its raking element. To translate vertical movements of the control wheels 38 into corresponding vertical movements of their respective raking elements, flexible tension members, such as cables 56, are secured to the support frame forward of each bearing 39, as at 57, passed over the sheaves 42, around the sheaves 53, 54 and 55, in that order, and secured to the inner end portion of the levers 49. So connected and with the guide wheels resting on the ground, the cables are tightened or loosened by manipulation of the lever to adjust the elevation of the raking elements in relation to their respective guide wheels. Once adjusted, the cables raise and lower the raking elements in response to the rising and falling of the guide wheels as they traverse uneven terrain, such vertical movements of the guide wheels being impressed on the cables by the sheaves 42.

*Operation*

The operation of the hay rake of the present invention is apparent from the preceding description and will be summarized briefly at this point. The elevational relationships of the raking elements 31 and their respective control wheels 45 are adjusted by releasing the catches 52 and positioning the levers 49 in attitudes achieving the ground, and/or hay engagement desired. The catches 52 then are released, engage their respective receptacles 51, and secure the levers in place. Thus, preconditioned for operation, the draft means 30 is attached to a drawing vehicle, such as a tractor, and the rake caused to traverse an area of mowed hay.

When the rake is turned in either direction the swivel wheel 21 and the control wheels 45 turn in response thereto. The raking elements 31 rise and fall individually in response to the terrain encountered by their respective control wheels and maintain substantially constant their adjusted relationships with the ground. By mounting the control wheels transversely and slightly forward of their respective raking elements, the raking elements are caused to rise or fall in brief anticipation of uneven terrain.

During normal operation, the direction of movement of the rake is substantially as indicated by the positions of the wheels in Fig. 1. As the teeth 35 encounter hay and/or the ground, the raking elements are caused to rotate by the drag imposed on the teeth. Because of the angular relationship existing between the planes of rotations of the raking elements and the direction of the movement of the rake, each tooth has a component of movement toward the side of the rake during hay engagement. The pattern described by each tooth while in ground and/or hay engagement is substantially a straight line at right angles to the direction of movement of the rake. Thus, each raking element rakes the encountered hay to the side where it, in turn, is encountered and continued to the side by each successive rearward raking element. The raking action is essentially a straight drawing of the hay to the side without rolling the same. This minimum disturbance of the hay during movement greatly reduces tangling and shattering incident to the use of conventional side delivery rakes.

To employ the rake as a cultivator, the levers 49 are repositioned to loosen the cables 56 until the teeth 35 engage the soil to the depth desired. The control wheels subsequently effectively limit the depth of cultivation according to the settings of the levers. Not only does the present apparatus provide efficient cultivating but the raking action of the teeth plus their upward movement as they rotate from the soil comb roots and other foreign materials from the soil and deposit them at the side of the rake.

To transport the rake, the levers 49 are set at positions tightening the cables sufficiently to raise the raking elements 31 clear of the ground. With the raking elements so supported, the rake of the present invention is speedily, conveniently and quietly towed from place to place.

The present invention provides a tractable, rugged, efficient, mobile, ground-driven combined hay rake and cultivator providing a minimum of resistance to forward movement during operation and conducive to the speedy raking of hay. Positive elevational control of the raking elements is provided by the control wheels and linkage, as described.

This application is a continuation in part of application having Serial Number 682,002, which was filed on July 8, 1946, issued as Patent No. 2,447,354 August 17, 1948.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices and systems.

Having described my invention, what I claim is new and desire to secure by Letters Patent is:

1. In a side delivery hay rake having a forwardly movable draft frame, support means for the frame attached thereto, said means including directional control means, and a plurality of rotary raking elements arranged in the frame for rolling movement over earth traversed by the frame, the combination of mounting means borne by the frame and individually mounting the raking elements in the frame for rotation in substantially erect parallel planes angularly displaced from the normal direction of movement of the frame, and for elevational movement during operation, control wheels individual to the raking elements mounted in the frame for reciprocal vertical movement in response to elevations and depressions in earth traversed, and means individually interconnecting the control wheels and their respective raking elements for unitary elevational movement.

2. In a side delivery hay rake having a mobile support frame, support means attached to the frame for maintaining the same in substantially constant attitude relative to earth traversed, said means including directional control means, staggered and overlapping rotary raking elements carried by said frame angularly disposed to the normal direction of movement of the rake, the combination of mounting and control means for the individual raking elements comprising means individually mounting the raking elements in the described arrangement for vertical movement in the frame, control wheels individual to the raking elements mounted in the frame for vertical movement, and means interconnecting the individual control wheels with their respective raking elements whereby weight of the raking elements is imposed on the control wheels and elevational movement of the control wheels is translated into corresponding elevational movement of their respective raking elements.

3. In a side delivery hay rake having a mobile support frame, means attached to said frame supporting the frame for ground traversing operations and maintaining the frame in a substantially constant attitude relative to the ground traversed, said means including directional control means, and rotary raking elements borne by the support frame in substantially parallel and erect planes of rotation angularly displaced from the normal direction of movement of the rake; the combination of mounting means borne by the frame and mounting the raking elements for individual and reciprocal elevational movement in the frame, control wheels individual to the raking elements mounted by the support frame in ground engagement and vertically movable relative to the frame in response to uneven terrain traversed, said control wheels being laterally adjacent their respective raking elements, and means interconnecting the mounting means of the raking elements and their respective control wheels and imposing the weights of the raking elements on their respective raking elements and translating elevational movement of the control wheels into corresponding elevational positioning of the raking elements.

4. In a side delivery hay rake having a mobile support frame, means attached to said frame supporting the frame for ground traversing operations and maintaining the frame in a substantially constant attitude relative to the ground traversed, said means including directional control means, and rotary raking wheels borne by the support frame and having substantially parallel and erect planes of rotation angularly displaced from the normal direction of the movement of the rake, crank levers individual to the raking wheels journaled in the frame, extended rearwardly from the journaled mountings and thence outwardly from the frame in substantially parallel relation to their journaled portions, the raking wheels being rotatably mounted on said outwardly extended portions of their respective crank levers, control wheels individual to the raking wheels and laterally adjacent thereto, means for mounting the control wheels for swivel movement in the frame and individual elevational movement relative thereto in response to elevations and depressions in terrain traversed, and a flexible tension means interconnecting the mounting means of the support wheels and their respective raking wheels for corresponding elevational movement.

5. In a side delivery hay rake having a mobile support frame, means attached to said frame supporting the frame for ground traversing operations and maintaining the frame in a substantially constant attitude relative to the ground traversed, said means including directional control means, and a plurality of rotary raking wheels, the combination of crank levers rotatably mounted in the support frame and receiving the raking wheels individually thereon journaled on the crank levers in echelon relation and obliquely to said rake's normal direction of movement, swivel control wheels individual to the raking elements and laterally spaced therefrom, mounting means borne by the frame and mounting the supporting wheels for individual elevational movement in response to rolling movement over uneven terrain, and flexible tension members interconnecting the frame and the individual mounting means for the raking wheels and engaged by the mounting means for said wheels' respective control wheels and tightened and loosened by elevational and depressive movement of the control wheels, and means for individually adjustably predetermining the lengths of the tension members to control the relative elevational positions of the raking wheels and their respective control wheels.

6. In a side delivery hay rake having a mobile support frame, means attached to said frame supporting the frame for ground traversing operations and maintaining the frame in a substantially constant attitude relative to the ground traversed, said means including directional control means, and a plurality of raking wheels arranged therein in substantially parallel erect planes angularly related to the normal direction of movement of the frame and in which each of said raking elements except the rearward most thereof forwardly overlaps its respective rearwardly adjacent raking wheel, crank levers rotatably mounted in the frame and mounting the raking wheels for individual elevational movement in the arrangement above described, yokes journaled in the frame in substantially erect positions adjacent the raking wheels for rotational and elevational movement, control wheels borne by the yokes in earth engagement, sheaves borne by the yokes for vertical movement therewith, sheaves borne by the support frame adjacent the yokes and below said yokes' respective sheaves, sheaves borne by the frame adjacent and above the crank levers, flexible tension members connected to the frame adjacent to the yokes, individually passed over the sheaves mounted in their respective yokes, downwardly through the sheaves mounted on the frame, upwardly through the sheaves mounted above the crank levers, and downwardly and connected to the crank levers at positions adjacent their respective raking wheels, and means for predetermining the operable lengths of the tension members whereby weight of the raking wheels is imposed upon their respective control wheels and vertical movement of the control wheels is translated into corresponding elevational movement of the raking wheels.

7. A side delivery rake comprising a mobile frame, means attached to said frame supporting the frame for ground traversing operation and maintaining the frame in a substantially constant attitude relative to the ground traversed, said means including directional control means, rotary raking means mounted on said frame for rotation in a plane at an angle to the direction of travel of the frame and for elevational movement relative to the frame, elevational control means mounted on the frame adjacent to the raking means for elevational movement relative to the frame, said elevational control means being disposed for ground engagement during earth traversing movement of the frame, and means interconnecting the elevational control means and the raking means for corresponding elevational movement in the frame.

8. A side delivery rake comprising a mobile frame, means attached to said frame supporting the frame for ground traversing operation and maintaining the frame in a substantially constant attitude relative to the direction of movement, said means including directional control means, a rotary raking wheel mounted on said frame for rotation in a plane at an angle to the direction of travel of the frame and for elevational movement relative to the frame, elevational control means mounted on the frame adjacent to the raking means for elevational movement in the frame, said elevational control means being disposed for earth engagement during raking operations, and means interconnecting the elevational control means and the raking wheel for corresponding elevational movement in the frame.

9. A side delivery rake comprising a mobile frame, means attached to said frame supporting the frame for ground traversing operation and maintaining the frame in a substantially constant attitude relative to the ground traversed, said means including directional control means, a rotary raking wheel mounted on said frame for rotation in a plane at an angle to the direction of the travel of the frame and for elevational movement relative to the frame, ground engaging elevational control means mounted on the frame adjacent to the raking wheel for elevational movement relative to the frame, and means connecting the elevational control means in supporting relation to the raking wheel.

10. A side delivery rake comprising a mobile frame, means attached to said frame supporting the frame for ground traversing operation and maintaining the frame in a substantially constant attitude relative to the ground traversed, said means including directional control means, a rotary raking wheel positioned in the frame for rotation in a plane at an angle to the direction of travel of the frame, a crank lever mounted in the frame for pivotal movement in a plane substantially parallel to the plane of rotation of the raking wheel and rotatably mounting the raking wheel for elevational movement relative to the frame, and means coacting with the crank lever for floatingly suspending the raking wheel on the frame.

11. A side delivery rake comprising a mobile frame, means attached to said frame supporting the frame for ground traversing operation and maintaining the frame in a substantially constant attitude relative to the ground traversed, said means including directional control means, a rotary raking wheel arranged in the frame for rotation in a plane at an angle to the direction of travel of the frame, a crank lever journaled in the frame and rotatably mounting the raking wheel for elevational movement, in said wheel's plane of rotation, control means mounted on the frame in earth engagement forwardly and laterally adjacent the raking wheel for elevational movement relative to the frame, and means interconnecting the elevational control means and the crank lever and supporting weight of the raking wheel imposed on the crank lever on said control means.

12. A side delivery rake comprising a mobile frame having a draft connection thereon, means attached to said frame supporting the frame for ground traversing operation, said means including directional control means, a rotary raking wheel positioned in the frame for rotation in a plane angularly displaced from the normal direction of movement of the frame, a crank lever journaled in the frame and rotatably mounting the raking wheel for elevational movement in the frame in the plane of rotation of said wheel, elevational control means mounted on the frame in earth engagement adjacent to the raking wheel for elevational movement relative the frame, means connecting the elevational control means to the crank lever in supporting relation to the raking wheel whereby the elevational control means and the raking wheel are interconnected for corresponding elevational movement, and means operably associated with the connecting means adjustably predetermining the relative elevation of the raking wheel and its control means.

13. A side delivery rake comprising a mobile frame, means attached to said frame supporting the frame for ground traversing operation and maintaining the frame in a substantially constant attitude relative to the ground traversed, said means including directional control means, a plurality of peripherally overlapping rotary raking means mounted on said frame in echelon arrangement and each rotatable in a plane at an angle to the direction of travel of said frame for individual elevational movement in the frame, ground engaging elevational control means individual to the raking means mounted on said frame adjacent to their respective raking means for elevational movement relative to the frame, and means individually connecting the elevational control means and their respective raking means for corresponding elevational movement in the frame.

14. A side delivery rake comprising a mobile frame, means attached to said frame supporting the frame for ground traversing operation and maintaining the frame in a substantially constant attitude relative to the ground traversed, said means including directional control means, a plurality of peripherally overlapping rotary raking means mounted on said frame in echelon arrangement and each rotatable in a plane at an angle to the direction of travel of said frame and for individual elevational movement in the frame, ground engaging control wheels individual to the raking means mounted in the frame for elevational movement relative to the frame in response to elevations and depressions in earth traversed by said wheels, means individually interconnecting the control wheels and their respective raking means for corresponding elevational movement, and adjustable means operably associated with the interconnecting means adjustably predetermining the relative elevational positions of the raking means and their respective control wheels.

15. In a side delivery hay rake having a forwardly movable draft frame, support means for the frame attached thereto, said means including directional control means, a rotary raking wheel positioned in the frame for rotation in a substantially erect plane at an angle to the direction of travel of the frame, a crank lever mounted in the frame and rotatably mounting the raking wheel for pivotal elevational movement in the plane of rotation of said wheel, and means coacting with the crank lever for floatingly suspending the raking wheel on the frame.

MELVIN A. MORRILL.

REFERENCES CITED

The following references are of record in the file of this patent:

UNITED STATES PATENTS

| Number | Name | Date |
|---|---|---|
| 468,382 | Beck | Feb. 9, 1892 |
| 720,098 | Bamford | Feb. 10, 1903 |
| 740,911 | Petro | Oct. 6, 1903 |
| 886,681 | Dain | May 5, 1908 |
| 1,637,644 | Isago | Aug. 2, 1927 |
| 2,214,073 | Butler | Sept. 10, 1940 |
| 2,371,076 | Stevens | Mar. 6, 1945 |
| 2,447,354 | Morrill | Aug. 17, 1948 |

FOREIGN PATENTS

| Number | Country | Date |
|---|---|---|
| 16,403 | Great Britain | May 23, 1912 |